US012663264B2

(12) United States Patent　(10) Patent No.: US 12,663,264 B2

Rondeau et al.　(45) Date of Patent: Jun. 23, 2026

(54) IN-PLACE INCLINOMETER

(71) Applicants:Samuel G. Rondeau, Lebanon, NH (US); Peter Twarog, Lebanon, NH (US)

(72) Inventors: Samuel G. Rondeau, Lebanon, NH (US); Peter Twarog, Lebanon, NH (US)

(73) Assignee: Geokon, Inc., Lebanon, NH (US)

( * ) Notice: Subject to any disclaimer, the term of this patent is extended or adjusted under 35 U.S.C. 154(b) by 307 days.

(21) Appl. No.: 18/501,999

(22) Filed: Nov. 4, 2023

(65) Prior Publication Data

US 2025/0146815 A1　May 8, 2025

(51) Int. Cl.
G01C 9/08　(2006.01)

(52) U.S. Cl.
CPC ...................................... G01C 9/08 (2013.01)

(58) Field of Classification Search
CPC ....................................................... G01C 9/08
USPC .................................. 33/1 H, 302, 304, 354
See application file for complete search history.

(56) References Cited

U.S. PATENT DOCUMENTS

| | | | |
|---|---|---|---|
| 3,014,282 A | 12/1961 | Wist | |
| 4,197,654 A * | 4/1980 | Van Steenwyk ...... | E21B 47/022 |
| | | | 33/324 |
| 4,297,790 A * | 11/1981 | Van Steenwyk ....... | G01C 19/38 |
| | | | 33/313 |

| | | | |
|---|---|---|---|
| 4,434,654 A | 3/1984 | Hulsing, II | |
| 4,461,088 A * | 7/1984 | Van Steenwyk ...... | E21B 47/022 |
| | | | 33/312 |
| 4,949,467 A | 8/1990 | Oman | |
| 6,487,782 B1 * | 12/2002 | Bond .................... | E21B 47/022 |
| | | | 33/304 |
| 6,842,990 B2 * | 1/2005 | Taylor ................... | E21B 47/022 |
| | | | 33/304 |
| 7,080,460 B2 | 7/2006 | Illfelder | |
| 7,200,292 B2 | 4/2007 | Shang | |
| 7,388,190 B2 | 6/2008 | Huang | |
| 7,751,657 B2 | 7/2010 | Lee | |
| 8,141,635 B2 | 3/2012 | Chang | |
| 9,777,568 B2 * | 10/2017 | Danisch ................. | E02D 31/00 |
| 10,955,402 B2 | 3/2021 | Basheer | |
| 11,614,326 B2 * | 3/2023 | Drewett ................... | G01C 9/06 |
| | | | 33/333 |
| 12,378,872 B2 * | 8/2025 | Phillips .................. | E21B 47/09 |
| 2006/0054354 A1 | 3/2006 | Orban | |

(Continued)

FOREIGN PATENT DOCUMENTS

| | | |
|---|---|---|
| CN | 103526782 A | 1/2014 |
| CN | 212274917 U | 1/2021 |

(Continued)

*Primary Examiner* — George B Bennett
(74) *Attorney, Agent, or Firm* — Lambert Shortell & Connaughton; David J. Connaughton, Jr.; Justin P. Tinger

(57) ABSTRACT

An in-place inclinometer system is provided. The system allows for improved precision in measurement compared to the prior art, as well as improved ease in packaging, installation, and manufacture. The system utilizes a plurality of probes which can fit into an inclinometer casing which may have an accelerometer within each probe and/or which may pivot relative to an adjacent probe while maintaining approximately the same measurement distance.

20 Claims, 8 Drawing Sheets

(56) References Cited

U.S. PATENT DOCUMENTS

2014/0102794 A1* 4/2014 Tevis .................... E21B 47/024
33/304
2016/0108719 A1 4/2016 Danisch

FOREIGN PATENT DOCUMENTS

CN      112698049 A  *  4/2021  ............. G01C 25/00
KR      10-1129692 B1      4/2012

* cited by examiner

IN-PLACE INCLINOMETER

BACKGROUND OF THE INVENTION

The present disclosure relates generally to an inclinometer to measure changes in inclination position. More particularly the present disclosure relates to a unique in-place inclinometer which provides increased measurement precision and reliability along with easier installation, packaging, and manufacture.

An inclinometer system is probably the most widely used instrument for the detection of ground movements. In typical applications, an inclinometer casing is in the ground. For monitoring the stability of an earth slope, an inclinometer equipped with wheels that fit tightly within grooves formed in the inclinometer casing is typically used to serve as the sensor unit to measure incline and/or change in incline over time. An electrical signal cable raises and lowers the probe in the casing and transmits signals to the ground surface. The probe measures the inclination of the inclinometer casing in reference to verticality. Readings from the sensor unit are taken at fixed intervals as the probe is raised or lowered in the casing. The displacement at any depth of the casing is determined according to the probe inclination measurements. The aforementioned method is usually carried out manually which is time consuming.

In other embodiments, an in-place-inclinometer probe exists which sets the sensor probes in the ground on a long term basis and allows automated data logging. The above-described ground displacement monitoring devices use an electrical system for sensing and signal transmission. Most of the electrical sensors are non-distributive in nature where one transmission line is dedicated to a specific sensor. When a large number of sensors are used, the equally large number of transmission lines can make the system impractical. The electrical signals are subject to electromagnetic interference. These systems suffer from precision issues due to being long rigid segments with sensors which are not calibrated to the contact points between inclinometer probe and casing (or which have an arbitrary contact point that is not factored in by the sensors.

These drawbacks make the electrical ground movement monitoring systems complicated or expensive to use. Further, installation of these in-place inclinometer systems is difficult and time consuming. The systems are installed as individual segments which must be manually assembled on site and then installed into a casing, which is difficult. Further, equipment such as a reel installation system is often required. In-place inclinometers in the present art also suffer from imprecision problems, such as long gauge lengths resulting in lack of resolution due to too few data points, and imprecise segment endpoints.

Though there have been many types of inclinometers available commercially, these sensors are not always reliable for ground displacement monitoring. They lack the necessary sensitivity and/or compatibility with the currently available ground displacement monitoring systems. Therefore, what is needed is an in-place inclinometer system which provides improved precision and reliability, improved contact with the inclinometer casing, as well as easy manufacture, packaging, and installation.

SUMMARY OF THE INVENTION

The subject matter of this application may involve, in some cases, interrelated products, alternative solutions to a particular problem, and/or a plurality of different uses of a single system or article.

In one aspect, an in-place inclinometer system is provided. The system involves a probe comprising a probe body with an accelerometer within the body. The probe body further has a pivotal connection point on the exterior of the probe body with a connector pivotally connected to the pivotal connection point. The probe body is rotatable relative to the connector via the pivotal connection point allowing a change in pitch of the probe body. Further, the probe body has a wheel assembly which allows it to move relative to an inclinometer casing in which it may be installed. Further still, the probe has a cord extending from each end of the probe body, the cord is electrically connected to the accelerometer and is connectable to a computerized system to receive output signals from the accelerometer.

In another aspect, an in-place inclinometer system is provided. The system includes a plurality of connected probes. Each probe has a probe body having an accelerometer within the probe body. Typically, the accelerometer is located close to a lengthwise center of the body, but location may vary in other embodiments. The probe body further has a pivotal connection point on the probe body with a connector pivotally connected to the pivotal connection point. The connector interconnects one probe to an adjacent of the plurality of probes by connecting to each pivotal connection point of the two probes. The probe body is rotatable relative to the connector and adjacent probes via the pivotal connection point. Each probe body has a wheel assembly which allows it to move relative to an inclinometer casing in which it may be installed. Further still, each probe has a cord extending from each end of the probe body which connects to an adjacent of the plurality of probes. The cord is electrically connected to the accelerometer in each probe and is connectable to a computerized system to receive output signals from the accelerometers.

The connection points at adjacent probes define the end points of a "gauge length." The accelerometer of each probe in turn provides readings near each end of the gauge length. An averaging of these two readings over the gauge length provides a higher resolution along a length of the inclinometer system compared to the prior art.

In yet another aspect, an in-place inclinometer system is provided. The system involves an inclinometer casing and a probe movable in a consistent orientation within the casing. The inclinometer casing defines internal grooves along its inside surface. The probe comprising a probe body having an accelerometer within the probe body. The probe body further has a pivotal connection point on the probe body with a connector pivotally connected to the pivotal connection point. The probe body is rotatable relative to the connector via the pivotal connection point. Further, the probe body has a wheel assembly which allows it to move relative to the inclinometer casing in which it may be installed by sliding along one or more internal groove of the casing. The wheels engaging with the groove ensures that the inclinometer maintains a constant axial orientation within the casing, which allows for proper inclination measurement. Further still, the probe has a cord extending from each end of the probe body, the cord is electrically connected to the accelerometer and is connectable to a computerized system to receive output signals from the accelerometer.

DETAILED DESCRIPTION OF THE INVENTION

Figure 1:
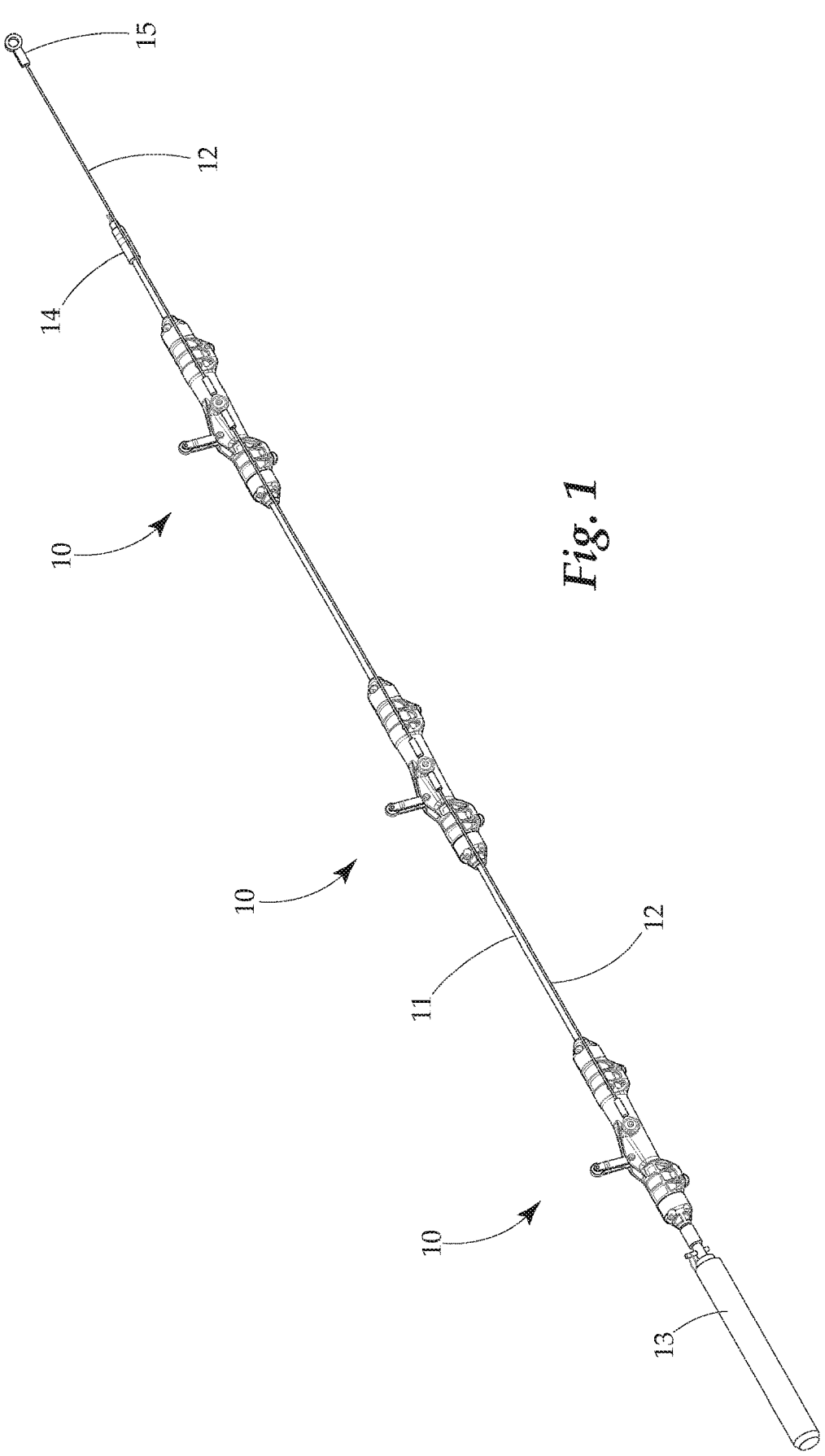
FIG. 1 provides a perspective view of an embodiment of the inclinometer of the present disclosure.

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

Generally, the present disclosure concerns an in-place inclinometer probe and system. The system has a plurality of probes, each of which has a unique configuration. The probes of the inclinometer system are formed of a body which is connectable to adjacent probes in the inclinometer system such that each probe body may pivot about a connection point freely relative to the adjacent probes. This allows for drastically improved precision in measurement of probe inclination and/or inclination change because the system as a whole is able to average readings from accelerometers in two adjacent probes. More data points provides a more accurate reading of inclination changes along the length of the inclinometer system. In some embodiments, the probes of the inclinometer system can be connected to each other in series by a flexible cable. This provides greater flexibility while maintaining gauge length, and also allows the system to be manufactured prior to installation, wrapped and packaged in a compact manner, and eases installation by simply allowing the system to be fed, probe by probe, into an inclinometer casing that holds the inclinometer. Of course, in other embodiments, a rigid connector system may be used which still allows at least some pivoting of the probes, without straying from the scope of this invention. The probe body has a wheel assembly which allows it to fit in and glide along tracks defined by an inclinometer casing.

The probe body may be formed of any material capable of housing the sensors (accelerometers, etc.) which is also able to support a pivoting connection of a connector which joins the probes in a string. In many embodiments, the probe body is formed of a plastic material, though any metal, composite, or similar material may be used without straying from the scope of the invention. Typically, the probe body is hollow to allow components such as the accelerometer and wiring to be placed therein. Access to the probe body hollow interior may be achieved by a side access panel or, more commonly, one or both open ends which are sealed by a removable cap. As noted below, a weight or weights may also be positioned within the probe body in certain embodiments to make the probe negatively buoyant in water. In many embodiments, the probe is formed to be waterproof to prevent damage caused by water infiltration.

The connector or connectors disclosed herein which join the probes to form the in-place inclinometer system may be any structure able to join two probes together. In one embodiment, the connector may be a flexible cable such as wire rope, often referred to as "aircraft cable." In another embodiment, the connector may be a rigid or flexible rod such as a metal rod, hollow tube, plastic rod or tube, and the like.

In most embodiments, the chain of probes connected together will be placed into a casing which is placed into the ground or structure to be measured. The casing, in many embodiments, is formed of an elongated pipe having grooves formed along its inner diameter. A wheel assembly of each probe engages with groove or grooves and this allows the probe to move down the pipe, and also ensures a constant axial orientation of the probes.

A cord connects the accelerometers (or equivalent sensors) of each probe to a computerized data logger or other computerized system. This allows for constant, automated monitoring of the status of the inclinometer probes and in turn, allows for monitoring of movement of the casing caused by a movement of the ground/structure surrounding the casing. A computerized display may provide charts or a rendering of the data readouts based on the data received. The computerized system may also be programmed to alert or send a notification upon a reading which exceeds a predetermined threshold, such as a concerning change in orientation of one or more probes. Further, the computerized system may also be programmed to alert or send a notification upon a failure or error code received by one or more of the sensors.

The probes may be formed as fairly short, elongate cylinders or cylinder-type structures. When connected to adjacent probes in a chain, each probe is spaced apart from the adjacent probe. In one embodiment, the probe may have at least one probe-length of open space between it and an adjacent probe. In another embodiment, the probe may have less than a probe length of open space between it and an adjacent probe. Spacing between probes may vary depending on desired application and needs, though in typical embodiments the probes are always spaced apart from each other and not connected end to end. The system contemplated herein allows for a substantial distance between probes. The ability of each probe to pivot relative to its adjacent probe allows them to be spaced further apart than the prior art. This may allow for a less expensive installation with fewer probes providing an equal level of precision due to the multiple sensors within each probe and pivoting ability of certain embodiments.

The wheel assembly may be one or more wheels connected to the probe. In the embodiments shown, two wheels are aligned along one axis on one side of the probe body, while on the opposite side, a wheel is positioned on a spring loaded arm. The spring loaded arm provides two advantages. One is that it provides a constant force against the inclinometer casing when installed, urging wheels on both sides of the probe to stay engaged with the track of the inclinometer casing. The second is that the spring loaded arm holding the wheel can engage with various different inner diameters of the inclinometer casing. This makes the system highly versatile and able to be used with a number of different inclinometer casings, including for replacing existing inclinometer systems while leaving an existing casing in place.

Turning now to FIG. 1, a view of an in-place inclinometer system is provided. The system, in this view, has a plurality of inclinometer probes 10 which are operable to measure their orientation and/or their change in orientation. This allows the inclinometer system to measure the incline or change in incline of a casing in which the inclinometers are held, and in turn the incline or change in incline of the surrounding ground and/or surrounding structure that the inclinometer is measuring. The inclinometer system of the present disclosure utilizes an inclinometer probe 10 having an accelerometer within the body. This structure provides for substantially improved precision compared to the prior art, allowing for improved movement sensitivity. The system is able to average readings taken by two adjacent probes, providing measurements over a particular gauge length (one at each end) rather than just one.

In this view, the probes 10 are flexibly connected to each other by a wire or cable 12 which connects pivotally to a pivotal connection point (shown in more detail in later figures). This is made possible, among other reasons, by the ability of the inclinometers to pivot in pitch relative to each other via the pivot point. As such, each inclinometer probe is able to pivot relative to the pivotal connection point and is thus able to precisely measure inclination by way of its accelerometer which, in this embodiment is spaced closely to the pivotal connection point. However in other embodiments, location of the accelerometer may vary within the body without straying from the scope of this invention. An electrical cord 11 also joins the probes 10 along the string. This cord is also flexible and is, in most embodiments, an electrical cable which electrically connects the accelerometers of each probe 10 with a data logger or other computerized system (not shown) via bus terminal 14. In typical embodiments, the cord 11 is not connected to the probes or designed to reliably hold the probes together, as that is the role of the connector such as cable 12 and connection points on the probe 10. However, in certain embodiments, the cord may be designed to carry tension and be the primary or only connection point between nodes 10 without straying from the scope of this invention. On one end of the plurality of probes 10, at the distal end of the chain, is a weight 13. The weight is important for embodiments having a flexible connector, such as that shown in FIG. 1 which uses a flexible cable 12. The weight ensures that the cable 12 remains under tension and as such, maintains a constant gauge length from one connection point on the probe 10 to a connection point on the adjacent probe 10. Consistent gauge length is important to determine the change in angle over a known distance. The terminal end of the cable 12 also has an end ring 15 which is attached to a support, such as an anchor/support bracket (not shown). The fixed position of the cable 12 end ring 15 allows the weight 13 to hold the remainder of the cable assembly 12 in tension. While the connectors in the embodiment shown are flexible cables, it should be understood that in other embodiment, rigid shafts may also be used as connectors to the probes without straying from the scope of this invention. The probes would remain pivotal relative to the rigid shafts or flexible cables, or other connectors, in these embodiments.

The pivotal connection point on the body is, in many embodiments located at or close to a lengthwise center of the body. However, in other embodiments it may be off center, such as along the middle half of the body. In preferred embodiments, the pivotal connection point is at least spaced apart from each lengthwise end (i.e. it is not at the end of the body). In some embodiments, the pivotal connection point may allow for a 360 degree rotation of the body. This may allow for a full rotation about the pitch axis of the body.

Figure 2:
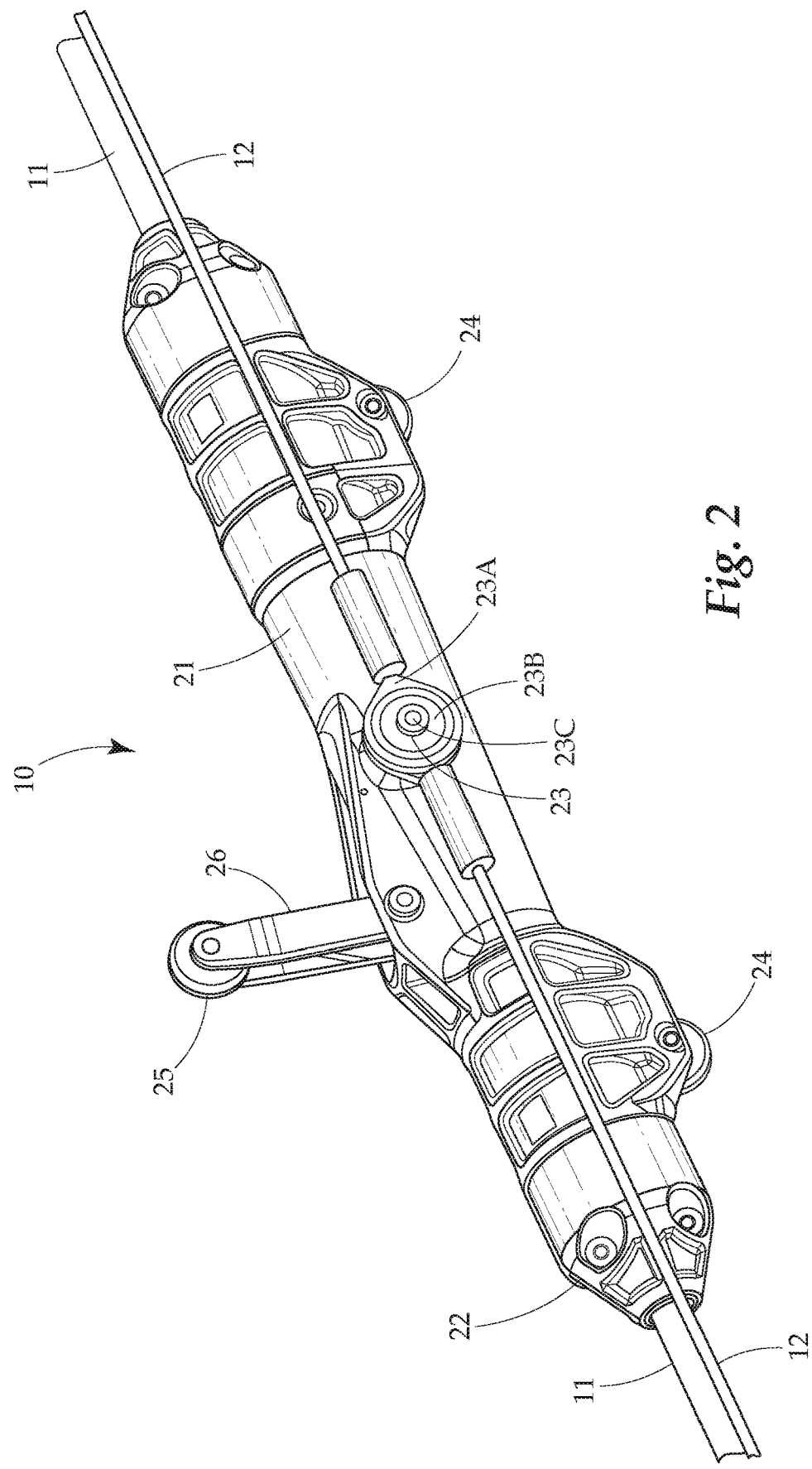
FIG. 2 provides a perspective view of another embodiment of the inclinometer of the present disclosure.
Figure 3:
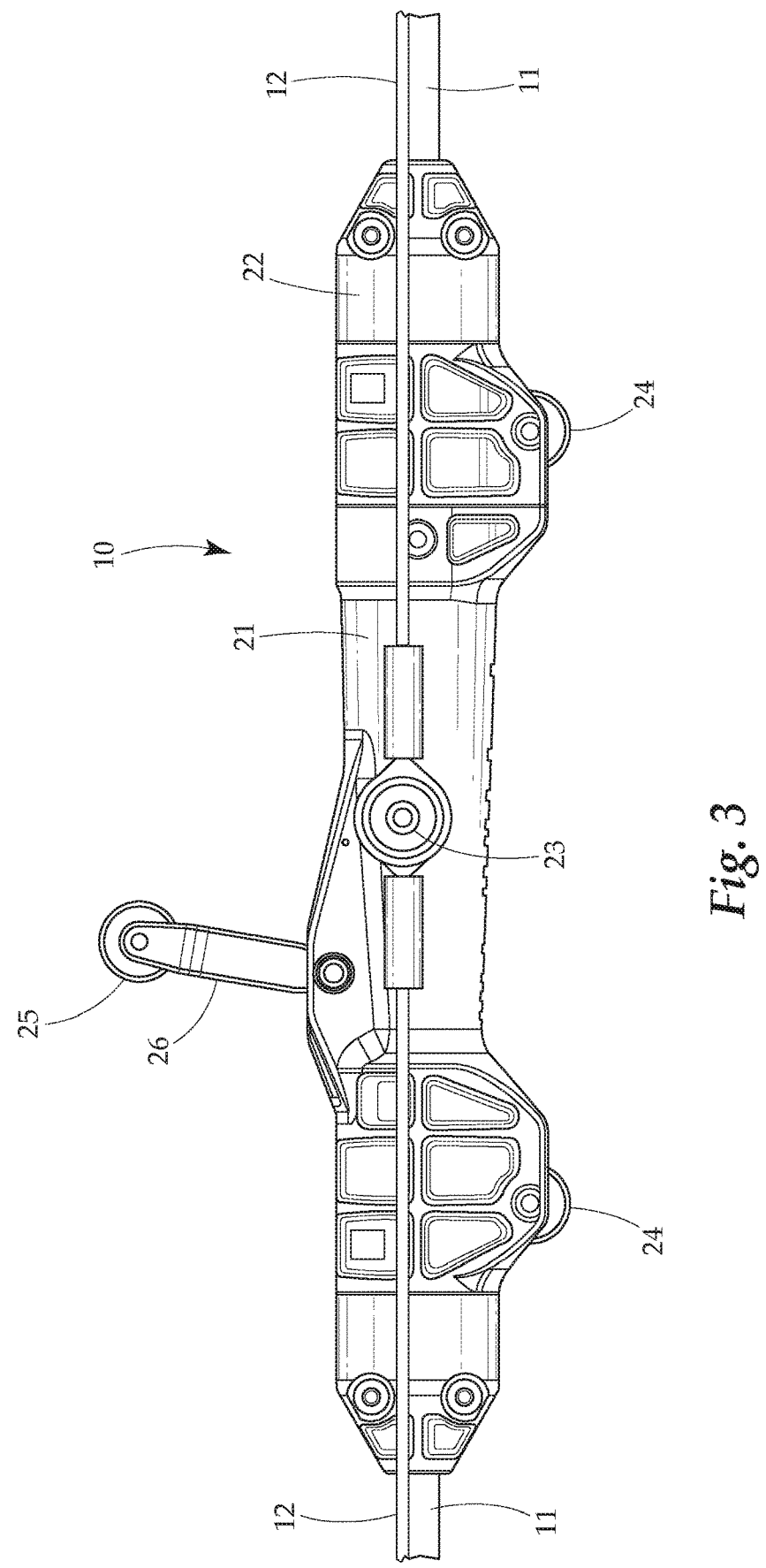
FIG. 3 provides a side view of the embodiment of FIG. 2.

FIGS. 2 and 3 shows a detailed view of an embodiment in-place inclinometer probe. The probe 10 has a body 21 which defines its structure. The cord 11 enters each end of the body 21 and is connected via end cap 22 on each end of the body 21. End caps, in this embodiment, have a tapering conical shape which allows cord 11 to pass through at the narrow end and for the cap 22 to connect to the probe body 21 at its wider end. Of course, other shapes may be used without straying from the scope of this invention. An accelerometer 28 is positioned within the body 21 near the lengthwise center of the body, in this embodiment shown. The cord 11 electrically connects to each accelerometer 28 and transmits signals from the accelerometer 28 to a data logger or computerized system. The body 21 has a wheel assembly connected thereto. The wheel assembly allows the probe to move smoothly and consistently within an inclinometer casing (not shown) to maintain its axial orientation within the casing. In this embodiment, one side of the body has two wheels 24 on the same axis. These wheels are configured to both engage with a groove within the inclinometer body again to ensure that the axial positioning of the inclinometer probe relative to the casing remains constant. Lack of consistent orientation will of course provide incorrect readings. The wheel assembly further includes a spring loaded arm 26 with a wheel 25 at the distal end of the arm. In most embodiment, third wheel 25 is located on an opposite side of the body 21 from the wheels 24. This configuration provides optimal balance of the inclinometer as well as reliable insertion and position maintenance with the casing, though is not required necessarily. This part of the wheel assembly is configured such that wheel 25 will engage in another groove of the casing, and the spring loaded arm 26 applies a force to the wheel 25 against the casing, thus providing for a tight and reliable fit to ensure wheels 25, 24 do not get displaced from grooves of the casing (not shown). The spring loaded arm 26 is also sized to allow the probe 10 to fit within multiple differently sized casings. For a narrow casing, the arm 26 can fold downward close to the body 21, and for wider casings, the arm 26 can extend further away from the body 21. In this embodiment, the spring loaded aspect of the arm 26 ensures that it is biased in an outwardly extended position and can be urged, against the spring force, towards the body 21.

Two connectors, shown here as cables 12, are pivotally connected to the body 21 via pivotal connection point 23. The pivotal connection point, in this embodiment, is formed of a pin extending from the body 21. Each cable 12 has an end ring 23A which fits over the pin. A washer 23B and screw 23C secure the end rings 23A to the body 21 while allowing the body 21 to rotate relative to the cables 12 about an axis defined by the pin (not visible in this embodiment), washer 23B and screw 23C. Of course, other embodiments of a pivotal connection point allowing a movement of the probe about, for example, a pitch axis, may be used without straying from the scope of this invention.

FIGS. 4-6 and 8 provide views of embodiments of the inclinometer probes positioned within an inclinometer casing. As discussed above, the inclinometer casing is a long tube or pipe which has pre-defined grooves in its inner diameter. The casing is placed into the ground and/or a structure, and then the inclinometer assembly is placed into the casing. Movements of the casing 40 surroundings are translated to the probes 10 which can measure change in position/orientation.

Figure 5:
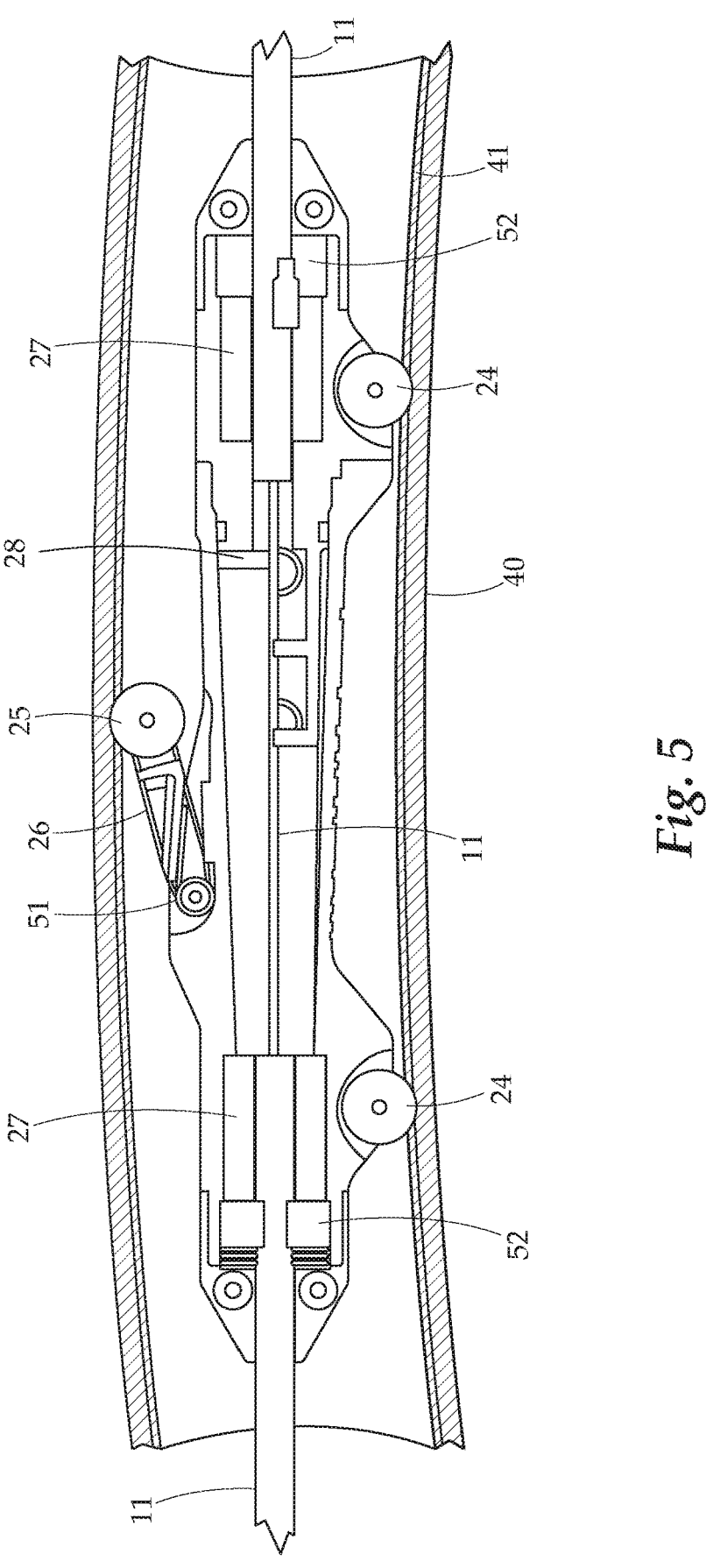
FIG. 5 provides a view of another embodiment of the inclinometer positioned within a casing.

FIG. 5 shows a cutaway view of both the casing 40 and probe 10. Inside the probe 10, a weight 27 is positioned at each end of the body. A cable seal 52 within the body 21 seals the opening in the body 21 through which the cable 12 passes. In this embodiment, the weight 27 is selected to be heavy enough to make the probe 10 as a whole negatively buoyant in water. In other words, the weight(s) 27 must be heavy enough to cause the overall density of the probe 10 to be denser than water. This may be important in many embodiments where groundwater is expected to infiltrate the casing. This is very common as groundwater is difficult to keep out over time. If submerged in water, the probe as a whole should be denser than its surrounding water so that it will allow the cables 12 to remain under tension and thus ensures a consistent gauge length. The wheels 24 and 15 are all engaged with grooves 41 which form tracks. The wheels 24 are engaged with one groove, while wheel 25 is engaged with another groove. Spring 51 urges wheel 25 against the groove 41, and in turn urges wheels 24 against the opposing groove. A cross sectional view of the inclinometer probe within a casing is shown which details the grooves 41 and the wheels 24 seating therein.

Figure 4:
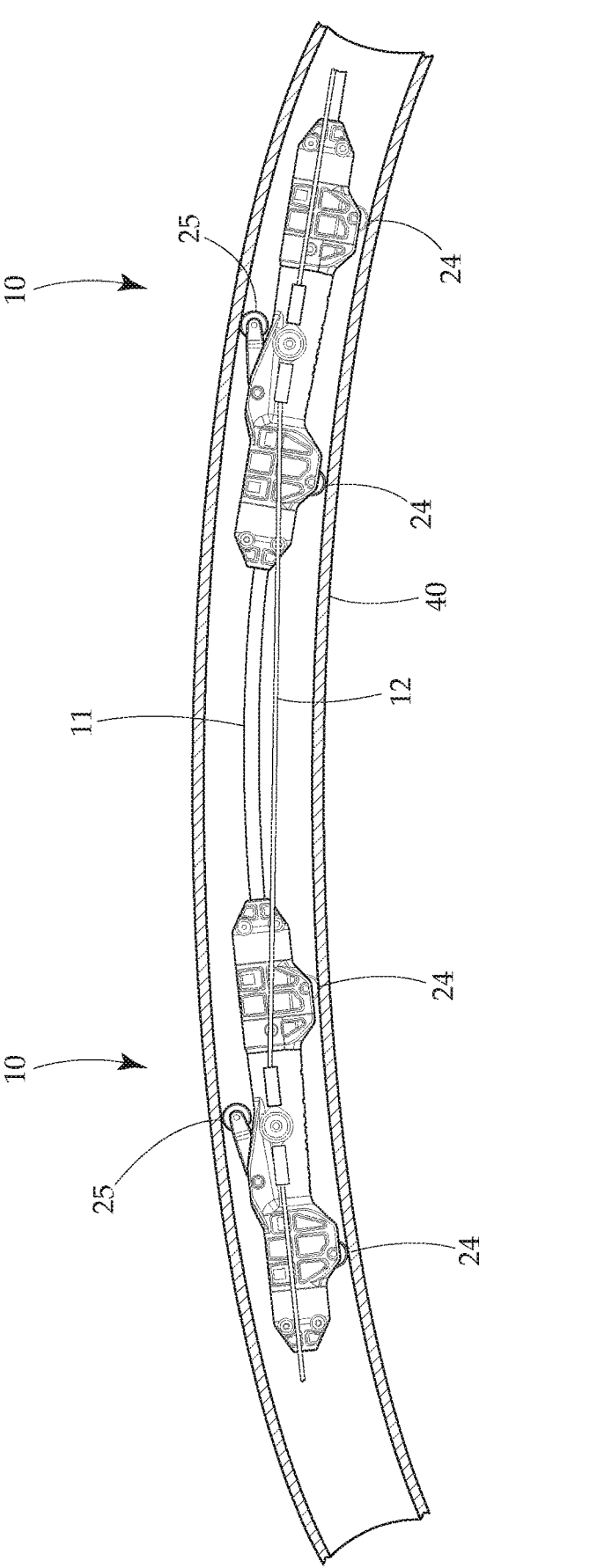
FIG. 4 provides a view of an embodiment of the inclinometer positioned within a casing.

FIG. 4 provides a view showing how the inclinometer probes 10 are able to pivot as the casing 40 bends or moves. The probes may then measure this movement and transmit the information about movement and its extent, to a data logger or other similar computerized system. As shown, the probes 10 pivot about the connection point 23, which then give readings from the accelerometer in the body. Further, because the body can pivot relative to the connection point of the cable 12, the gauge length remains constant even when the casing bends. This can be seen by the curve in the cable 12 but straight and tensioned path of the cord 11. This again yields improved precision by having a more reliably fixed distance between probes than is possible compared to the prior art devices. When adjacent probes are connected, the cord 11 is, in most embodiments, slightly longer than the cable 12. This allows the cable 12 to bear the tension between the probes, leaving the cord 11 un-tensioned (to prevent damage to the cord and electrical connections). This also allows the cable 12 to stay straight as the probes move, as seen in FIG. 4) while the cord 11 is able to gently curve rather than being pulled tight and straight. This slack in the cord 11 also ensures that the ends of the probes to which the cord 11 is connected are able to move without excessive strain on the cord 11 which could in some case interfere with the measurement by the accelerometer based on the cord changing position of the body or limiting its motion.

Figure 6:
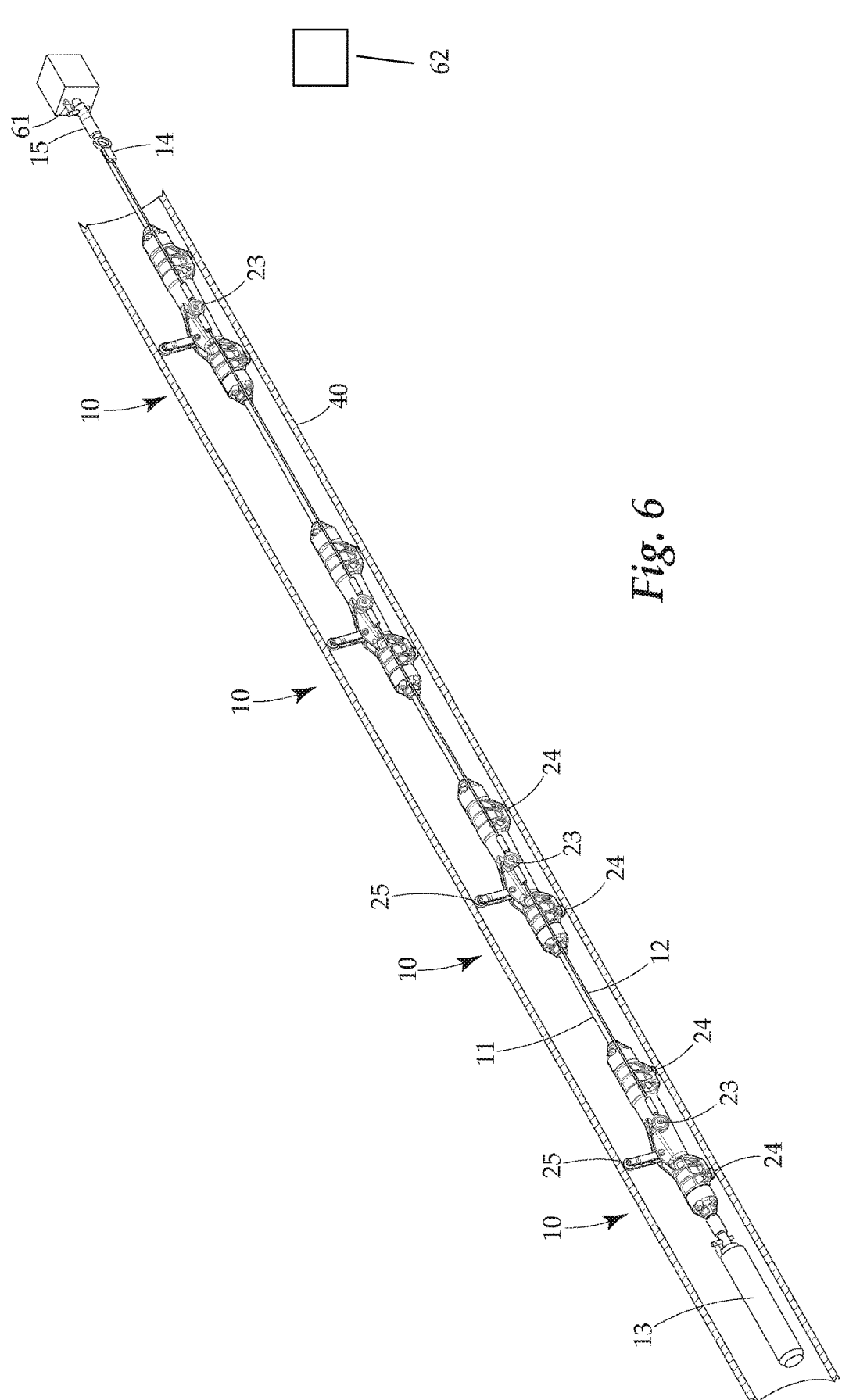
FIG. 6 provides a view of another embodiment of the inclinometer positioned within a casing.

As seen in FIG. 6, a string of the probes 10 forming the in-place inclinometer system are positioned within the casing 40 which is then placed into the ground and/or structure which is being monitored. The probes 10, in this embodiment, are connected via cable 12 and are maintained under tension to keep the gauge length consistent by weight 13 and support bracket 61. Terminal end loop 15 of the cable 12 connects to support bracket 61 and weight 13 connects to the distal end of the distal probe 10 in the system. A data logger 62 is electrically connected to the cord 11 and in turn the accelerometers of each probe via data connection 14.

Figure 7:
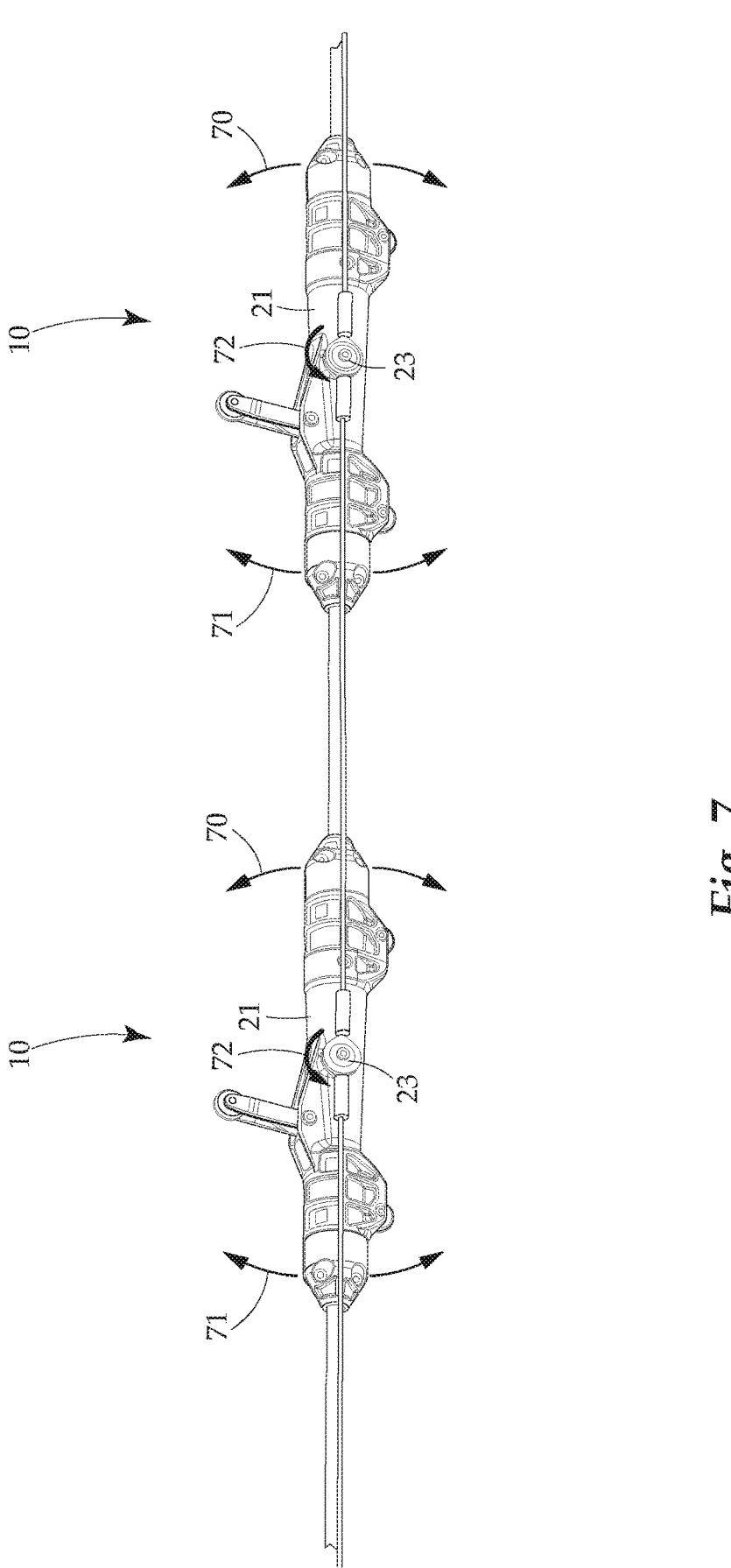
FIG. 7 provides a view of an embodiment of the inclinometer and movement ranges.
Figure 8:
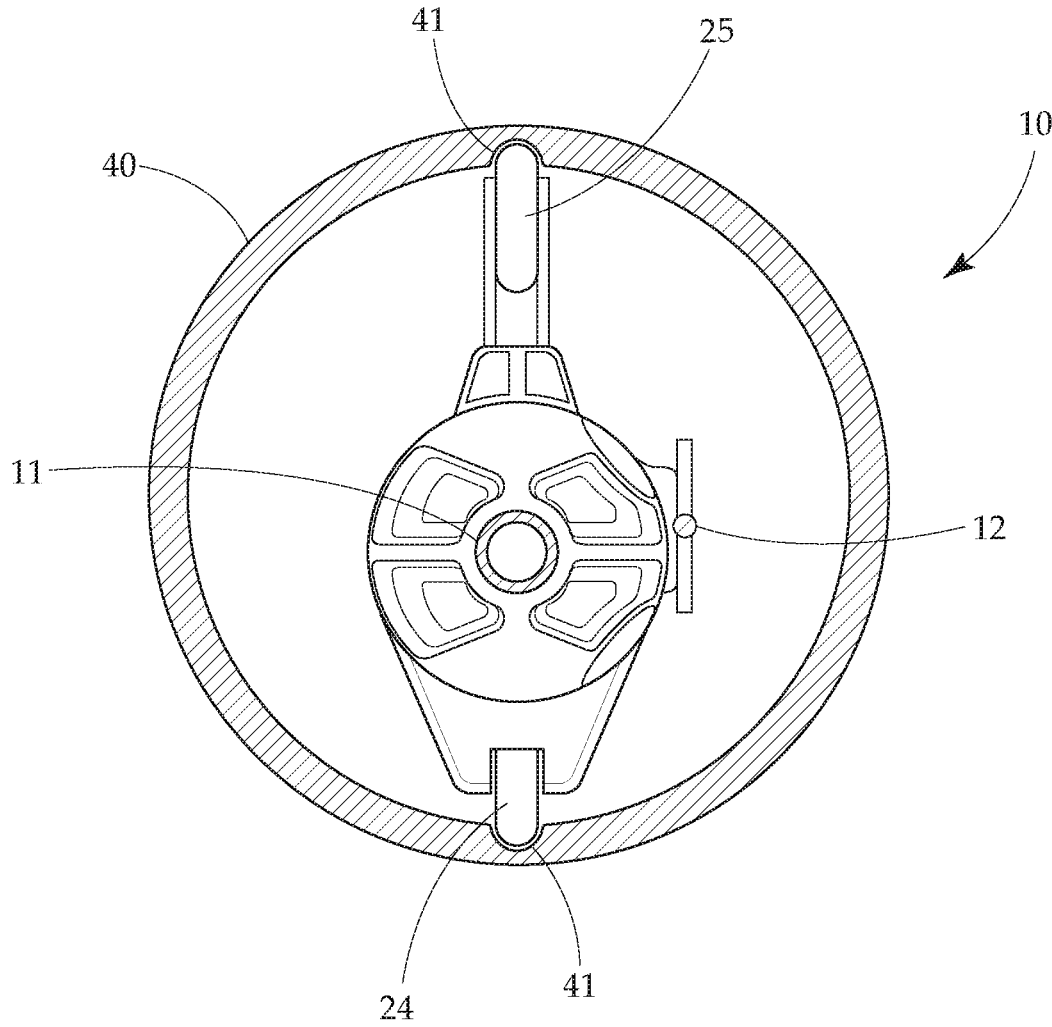
FIG. 8 provides a cross-sectional view of an inclinometer positioned within an inclinometer casing.

FIG. 7 provides a view showing the pivoting ability of the each probe 10 to pivot relative to the connection point 23 and achieve readings via accelerometer 28 of the probe 10. Whether connector is a flexible cable or a rigid shaft, it will pivotally connect to the body 21 of a probe 10 via the connection point 23. This allows the body 21 to rotate about the connection point 23 as shown in path 72. This in turn allows for movements 70 and 71 within the casing as the casing moves in response to the surrounding environment. In certain embodiments, movements into and out of the page (such as about a "yaw" axis) can also be measured, particularly in embodiments having a flexible connector cable which can accommodate such movements, and/or in embodiments where the connection to the connection point 23 allows for some movement in this direction.

While several variations of the present disclosure have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth.

What is claimed is:

1. An in-place inclinometer system comprising:
   a probe comprising a probe body having an accelerometer within the probe body;
   a pivotal connection point on the probe body with a connector pivotally connected to the pivotal connection point, the pivotal connection point being located along a length of the body and spaced apart from each lengthwise end of the body;
   the probe body being rotatable relative to the connector via the pivotal connection point;
   the probe body further comprising a wheel assembly with at least one wheel;
   a cord extending from each end of the probe body and being electrically connected to the accelerometer.

2. The in-place inclinometer system of claim 1 wherein the connector is a flexible cable.

3. The in-place inclinometer system of claim 1 wherein the connector is a rigid rod.

4. The in-place inclinometer system of claim 1 further comprising a weight attached to one end of the probe body.

5. The in-place inclinometer system of claim 1 further comprising a weight positioned within the probe body, the weight selected to cause the probe to be negatively buoyant in water.

6. The in-place inclinometer system of claim 1 wherein the wheel assembly comprises an arm extending from the body and pivotal relative to the probe body and a wheel at a distal end of the arm, the arm pivotal relative to the probe body against a spring force.

7. The in-place inclinometer system of claim 1 wherein the accelerometer is configured to measure in multiple dimensions.

8. The in-place inclinometer system of claim 1 wherein the pivotal connection point is positioned at a lengthwise center of the probe body.

9. The in-place inclinometer system of claim 1 wherein the probe body is water proof.

10. The in-place inclinometer system of claim 1 wherein the probe body comprises a central body defining a cavity, and two end caps sealing each end of the probe body, the accelerometer positioned within the central body, and the central body further comprising a weight selected to make the probe body as a whole negatively buoyant in water; and
    wherein the wheel assembly comprises two wheels on a first side of the body, and an arm extending from the opposite side of the body that is pivotal relative to the probe body and a third wheel at a distal end of the arm, the arm pivotal relative to the probe body against a spring force.

11. The in-place inclinometer system of claim 1 wherein the accelerometer is in electronic communication with a computerized data logger via the cord.

12. An in-place inclinometer system comprising:
    a plurality of connected probes, each probe comprising:
    a probe body having an accelerometer within the probe body;
    a pivotal connection point on the probe body with a connector pivotally connected to the pivotal connection point, the pivotal connection point being located along a length of the body and spaced apart from each lengthwise end of the body;

a wheel assembly with at least one wheel; and a cord extending from each end of the probe body and being electrically connected to the accelerometer;

wherein each probe is connected to an adjacent one of the plurality of probes by a connector, wherein the connector allows a pivotal rotation of each of the plurality of probes about the pivotal connection point, each connector being pivotally connected to the pivotal connection point of each adjacent of the plurality of probes; and wherein the cord of each of the plurality of probes is electrically connected to an adjacent one of the plurality of probes.

13. The in-place inclinometer system of claim 12 wherein the connector is a flexible cable.

14. The in-place inclinometer system of claim 12 wherein the connector is a rigid rod.

15. The in-place inclinometer system of claim 12 further comprising a weight attached to one end of a distal one of the plurality of connected probes, and wherein a connector connected to a proximal one of the plurality of connected probes is attached to a support bracket, a force applied to the connected plurality of probes by the weight and support bracket holding the connectors of the plurality of connected probes under tension.

16. The in-place inclinometer system of claim 12 wherein each of the plurality of probes comprises the probe body having a central body defining a cavity, and two end caps positioned at each end of the probe body, the accelerometer positioned within the central body, and the central body further comprising a weight selected to make the probe body as a whole negatively buoyant in water; and wherein the wheel assembly comprises two wheels on a first side of the body, and an arm extending from the opposite side of the body that is pivotal relative to the probe body and a third wheel at a distal end of the arm, the arm pivotal relative to the probe body against a spring force.

17. The in-place inclinometer system of claim 12 wherein the plurality of probes are positioned inside a inclinometer casing, the inclinometer casing defining internal grooves, and wherein the wheel assembly of each of the plurality of probes is engaged with at least one of the internal grooves.

18. An in-place inclinometer system comprising:

an inclinometer casing, the inclinometer casing defining internal grooves along its inside surface;

a probe comprising a probe body having two accelerometers within the probe body, one accelerometer adjacent to each end of the probe body;

a cord extending from each end of the probe body and being electrically connected to the accelerometer; and wherein a wheel assembly of the probe body is engaged with at least one of the internal grooves and movable along the at least one of the internal grooves; and wherein a force applied to the probe holds the probe under tension.

19. The in-place inclinometer system of claim 18 further comprising a plurality of probes, each of the plurality of probes having the wheel assembly comprising two wheels on a first side of the probe body, and an arm extending from the opposite side of the probe body that is pivotal relative to the probe body and a third wheel at a distal end of the arm, the arm pivotal relative to the probe body against a spring force, wherein the two wheels are engaged with one of the internal grooves and the third wheel is engaged with another one of the internal grooves.

20. The in-place inclinometer system of claim 18 wherein the probe body further comprises a pivotal connection point on the probe body with a connector pivotally connected to the pivotal connection point, the pivotal connection point being located along a length of the body and spaced apart from each lengthwise end of the body;

the probe body being rotatable relative to the connector via the pivotal connection point; and the probe body further comprising a wheel assembly with at least one wheel.

\*　\*　\*　\*　\*